United States Patent [19]

Kushibiki et al.

[11] Patent Number: 5,548,050

[45] Date of Patent: Aug. 20, 1996

[54] METHOD FOR THE PREPARATION OF ORGANIC SOLVENT-SOLUBLE POLYTITANOSILOXANES

[75] Inventors: Nobuo Kushibiki; Yoko Sugata, both of Kanagawa Prefecture, Japan; Toshio Suzuki, Midland, Mich.

[73] Assignee: Dow Cornings Asia, Ltd., Tokyo, Japan

[21] Appl. No.: 390,737

[22] Filed: Feb. 17, 1995

[30] Foreign Application Priority Data

Feb. 25, 1994 [JP] Japan .................................... 6-028346

[51] Int. Cl.⁶ .................................................. C08G 79/00
[52] U.S. Cl. ................................ 528/9; 528/10; 528/32
[58] Field of Search ...................................... 528/9, 10, 32

[56] References Cited

U.S. PATENT DOCUMENTS

| | | | |
|---|---|---|---|
| 2,676,182 | 4/1954 | Daudt et al. | 260/448.2 |
| 2,716,656 | 8/1955 | Boyd | 260/429 |
| 2,814,601 | 11/1957 | Currie et al. | 160/29.1 |
| 3,625,934 | 12/1971 | Rinse | 260/97.5 |
| 4,238,590 | 12/1980 | Scholze et al. | 528/5 |
| 4,495,322 | 1/1985 | Liebler | 524/198 |
| 4,707,531 | 11/1987 | Shirahata | 528/12 |
| 4,715,999 | 12/1987 | Dislich et al. | 528/26 |
| 5,357,024 | 10/1994 | Leclaire | 528/39 |

FOREIGN PATENT DOCUMENTS 5078489  3/1993  Japan .

OTHER PUBLICATIONS

W. Noll, Chemistry and Technology of Silicones, Chapter 7 (Academic Press).

*Primary Examiner*—Melvyn I. Marquis
*Attorney, Agent, or Firm*—Patricia M. Scaduto

[57] ABSTRACT

The invention is a method for the preparation of organic solvent-soluble polytitanosiloxanes that contain units with the formulas $R^1_a R^2_{(3-a)} SiO_{1/2}$ (M units), $SiO_{4/2}$ (Q units) and $TiO_{4/2}$. The method comprises hydrolyzing tetraalkyl titanate or a partial hydrolyzate-condensate thereof and tetraalkyl silicate or a partial hydrolyzate-condensate thereof using water in an amount which is less than 80% of the amount theoretically necessary for the hydrolysis of all the alkoxy groups, and reacting the cohydrolyzate-cocondensate with at least 1 silane compound with the formula $R^1_a R^2_{3-a} SiOR^3$, where in the preceding formulas, $R^1$ is the hydrogen atom or a monovalent organic group, $R^2$ is a monovalent organic group, $R^3$ is the hydrogen atom or an acyl group having no more than 8 carbon atoms, and a is an integer with a value of 0 to 3.

9 Claims, No Drawings

METHOD FOR THE PREPARATION OF ORGANIC SOLVENT-SOLUBLE POLYTITANOSILOXANES

The invention relates to a method for the preparation of novel polytitanosiloxanes. The silicone industry uses the term "MQ resin" to designate organic solvent-soluble polyorganosiloxanes composed of siloxane units in which 3 organic groups are bonded on silicon, $R_3SiO_{1/2}$ units also known as M units, and siloxane units free of organic groups, $SiO_{4/2}$ units known as Q units. MQ resin is used, for example, as a hard coating material and as a pressure-sensitive adhesive, see for example, Kunio Itoh (ed.), *Skirikon Handobukku [Silicone Handbook]*, Nikkan Kogyo Shinbunsha.

Substances composed of the Q and $TiO_{4/2}$ units, called "silica-titania", are known as low-expansion glasses in the field of inorganic materials. There are, however, very few reports of silica-titania containing organic groups bonded to silicon. Otherwise, the so-called polytitanosiloxanes, in which titanium atom substitution occurs in part of the polysiloxane, are well known and are described, for example, in Chapter 7 or *Chemistry and Technology of Silicones*, by W. Noll (Academic Press).

Nevertheless, there has been no report heretofore of organic solvent-soluble polytitanosiloxanes whose main structural elements are M, Q, and $TiO_{4/2}$ units. While a method for the preparation of similar compounds is suggested in Japanese Patent Application Laid-Open [Kokai] Number Sho 61-228919 [228,919/1986], the Q unit is not therein cited as an essential component, and, therefore, the corresponding examples are not described. Such a Q unit-free polytitanosiloxane lacks stability with regard to moisture and heat, which impairs its practical applications. Moreover, the preparative method in Japanese Patent Application Laid-Open Number Sho 61-228919 uses the entire amount of water necessary for complete hydrolysis and condensation. This ultimately leads to the production of titania gel and makes it difficult to produce a transparent polymer.

The invention is a method for the preparation of a heretofore unknown organic solvent-soluble polytitanosiloxane whose essential constituents are M, Q, and $TiO_{4/2}$ units. More specifically, the invention is a preparative method that suppresses titania gel formation while yielding polytitanosiloxane that is stable to moisture and heat.

SUMMARY OF THE INVENTION

The target polytitanosiloxane can be synthesized by hydrolysis and condensation of tetraalkyl titanate or a partial hydrolyzate-condensate thereof and tetraalkyl silicate or a partial hydrolyzate-condensate thereof using water in an amount which is less than 80% of the amount necessary for the hydrolysis and condensation of all the alkoxy groups; followed by subsequent reaction with at least 1 silane compound with the formula $R^1{}_a R^2{}_{(3-a)} SiOR^3$, where $R^1$ is a hydrogen atom or a monovalent organic group, $R^2$ is a monovalent organic group, $R^3$ is the hydrogen atom or an acyl group having no more than 8 carbon atoms and a is an integer with a value of 0 to 3.

DETAILED DESCRIPTION OF THE INVENTION

The alkyl group of the tetraalkyl titanate and tetraalkyl silicate is exemplified by methyl, ethyl, propyl, isopropyl, butyl, sec-butyl, tert-butyl, pentyl, hexyl, heptyl, and octyl. Substitutents such as alkoxy and halogen may also be bonded to the alkyl group. In the particular case of the titanate reactant, the alkyl group is preferably not methyl from the standpoint of solvent solubility and preferably contains no more than 10 carbons from the standpoint of hydrolyzability. In the particular case of the silicate reactant, alkyl groups having no more than 6 carbons are preferred from the standpoint of the hydrolysis rate.

The partial hydrolyzate-condensate specified for the said titanate and silicate is the product yielded by the hydrolysis and condensation of the tetraalkyl titanate or tetraalkyl silicate using water in an amount less than that necessary for the hydrolysis and condensation of all the alkoxy groups. This product thus corresponds to an oligomer. Since the titanate or silicate structure will already have been formed to a small extent, use of the partial hydrolyzate-condensate as a starting material facilitates control of the hydrolysis and condensation reaction in polytitanosiloxane synthesis.

There are absolutely no restrictions on the weight ratio between the tetraalkyl titanate or partial hydrolyzate-condensate thereof and the tetraalkyl silicate or partial hydrolyzate-condensate thereof. However, the Ti/Si ratio preferably falls between $1/60$ and $100/1$ from the standpoint of the properties of the polytitanosiloxane product. This ratio preferably falls between $1/10$ and $10/1$ in order to simultaneously obtain satisfactory optical properties and stability.

A characteristic feature of the invention is that the tetraalkyl titanate or partial hydrolyzate-condensate thereof and tetraalkyl silicate or partial hydroxlyzate-condensate thereof are hydrolyzed and condensed using water in an amount which is less than 80% of the amount theoretically necessary for the hydrolysis and condensates of all the alkoxy groups. Said theoretically necessary amount corresponds to 0.5 mole water per 1 mole alkoxy group. This characteristic feature is crucial for preventing gelation. When the amount of water is greater than or equal to 80%, a titania gel is frequently produced because the tetraalkyl titanate is ultimately completely hydrolyzed and condensed. The water quantity is preferably at least 10% of the theoretically necessary amount because lower values do not give a satisfactory production of polymer. The preferred water addition is at least 20% but no more than 75% of the quantity necessary for the hydrolysis and condensation of all the alkoxy groups.

The hydrolysis and condensation reaction can be run by introducing the tetraalkyl titanate or partial hydrolyzate-condensate thereof and tetraalkyl silicate or partial hydrolyzate-condensate thereof simultaneously or successively. More specifically in the latter case, hydrolysis and condensation of the tetraalkyl titanate or partial hydrolyzate-condensate thereof may be carried out first using water in an amount which is less than 80% of the amount necessary for the hydrolysis and condensation of all the alkoxy groups. This would be followed by addition of the tetraalkyl silicate or partial hydrolyzate-condensate thereof and hydrolysis and condensation in the same manner. This order of addition can be reversed, and the reactants can be divided into any number of portions and added in alternation.

The hydrolysis and condensation reaction will run in the absence of catalyst, but a catalyst may be used if desired. Catalysts used here comprise any acidic, basic, or other catalyst generally used in the sol-gel method. The hydrolysis and condensation reaction can be run in a suitable solvent or may be run in the absence of solvent. Any solvent can be used that is capable of adequately dissolving the starting compounds and polymer product and does not adversely affect the reaction. The solvents are exemplified by aliphatic hydrocarbons such as pentane, hexane, heptane, and octane; aromatic hydrocarbons such as benzene, toluene, and xylene; ether solvents such as diethyl ether, dibutyl ether, diphenyl ether, dioxane, and tetrahydrofuran; ester solvents such as ethyl acetate and butyl acetate; ketone solvents such as acetone, methyl ethyl ketone, and methyl butyl ketone; and halogenated solvents such as carbon tetrachloride, chloroform, trichloroethane, trichloroethylene, and tetrachloroethane; as well as dimethylformamide, dimethyl sulfoxide, and hexamethyltriamide phosphate.

The preparative method of the present invention must employ a procedure that obligatorily leads to the formation of a cohydrolyzate-cocondensate from the tetraalkyl titanate or partial hydrolyzate-condensate thereof and tetraalkyl silicate or partial hydrolyzate-condensate thereof. In specific terms, care must be taken to avoid gel formation during the addition of water to the tetraalkyl titanate or partial hydrolyzate-condensate thereof. Measures that can be taken to this end are exemplified by very gradual dropwise addition of the water, for example, no more than 10 weight % of the total water addition per minute; addition of the water after its dilution in at least an equal volume of water-soluble organic solvent; addition of the water carried or adsorbed on a water-adsorptive solid such as silica gel, zeolite, calcium chloride, sodium sulfate, magnesium sulfate, aluminum oxide, aluminum hydroxide, etc., and particularly silica gel; and cooling the reactants during addition of the water, to 0° C. to −100° C. and preferably to −20° C. to −90° C. However, any suitable measure may be used. After addition of the water and stabilization of the system, a process such as heating at reflux can be carried out in order to complete the hydrolysis and condensation reaction.

After addition of the water, the reaction mixture is reacted with at least 1 silane compound with the formula $R^1_a R^2_{(3-a)}SiOR^3$ in order to produce the desired polytitanosiloxane. $R^1$ in this formula is a hydrogen atom or a monovalent organic group while $R^2$ is a monovalent organic group. The monovalent organic groups preferably contain no more than 10 carbons and are exemplified by alkyl groups such as methyl, ethyl, propyl, isopropyl, butyl, sec-butyl, tert-butyl, pentyl, hexyl, heptyl, and octyl; aryl groups such as phenyl, tolyl, xylyl, and mesityl; alkenyl groups such as vinyl, allyl, propenyl, and butenyl; and haloalkyl groups such as chloromethyl and trifluoropropyl. Methyl, phenyl, and vinyl are preferred from the standpoints of ease of acquisition and economics. $R^3$ is a hydrogen atom or an acyl group having 8 or fewer carbon atoms, and hydrogen and acetyl are preferred from a consideration of reactivity. The subscript a is an integer with a value of 0 to 3.

Upon addition of this silane compound, the alkoxy groups not consumed in the preceding hydrolysis and condensation reaction undergo condensation with the silane compound, which completes the synthesis of a stable and solvent-soluble polytitanosiloxane. When $R^3$ in the silane compound is hydrogen, alcohol is produced as a result of the condensation reaction, while a carboxylic acid ester is produced when $R^3$ is acyl. The reaction can be brought to completion by removal of the alcohol or ester by heating and/or a vacuum. Any number of different silane compounds may be added, and the silane compounds should be selected based on the type of organic groups desired in the polytitanosiloxane product. The quantity of the silane compound added is not critical, but the quantity of the addition preferably exceeds the number of moles of the residual alkoxy groups left unconsumed by the preceding hydrolysis reaction. 1.5 to 5 moles of silane compound is preferably added for each mole of residual alkoxy groups.

In some cases, it may be desired that alkoxy or hydroxyl remain bonded to the polytitanosiloxane molecule. Alkoxy- or hydroxy-functional polytitanosiloxane can be prepared by adjusting the type and/or quantity of addition of the silane compound. For example, because the silanol is generally more reactive than the acyloxysilane, survival of the alkoxy group can be facilitated through use of acyloxysilane as the silane compound.

The invention will be explained below in greater detail through the use of working examples. In the examples, the average molecular weight is the value obtained by gel permeation chromatography (GPC) using polystyrene calibration. Structural determination was carried out using proton nuclear magnetic resonance spectroscopy, $^{29}Si$ nuclear magnetic resonance spectroscopy and atomic absorption spectroscopy. In addition, room temperature indicates 25° C. and the following abbreviations are used: Me for methyl, Vi for vinyl, Ph for phenyl and THF for tetrahydrofuran.

EXAMPLE 1

To a solution consisting of a mixture of 5.27 g (15.5 mmol) titanium tetra-n-butoxide and 10 mL THF was added, over 20 minutes and at −78° C., a solution consisting of a mixture of 0.255 g (14 mmol) water and 5 mL THF. The reaction was subsequently allowed to return to room temperature and was stirred for 1 hour. After re-cooling to −78° C., 1.23 g of an already partially hydrolyzed and condensed ethyl orthosilicate (ethoxy group=20 mmol, $SiO_2$ content= 40 weight %) was added and the reaction was stirred. This was followed by the dropwise addition of 0.255 g (14 mmol) water in 5 mL THF. The solution temperature was then allowed to return to room temperature and the reaction was stirred for another 30 minutes. A 45 g ether solution that contained 67 mmol vinyldimethylsilanol was added and the reaction was stirred for 30 minutes. The reaction was then developed by gradually heating to 120° C. while distilling the solvent. Removal of the solvent and low boilers at 120° C. under reduced pressure ultimately yielded 3.60 g of a transparent light-yellow solid.

This product was soluble in organic solvents such as THF, toluene, hexane, and carbon tetrachloride. Its molecular weight was $6.59 \times 10^6$, and its index of refraction at 25° C. was 1.561. The analytic results gave the following compositional formula:

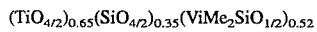

$$(TiO_{4/2})_{0.65}(SiO_{4/2})_{0.35}(ViMe_2SiO_{1/2})_{0.52}$$

COMPARATIVE EXAMPLE 1

An experiment was run according to Example 1 using 0.56 g water in the first water addition instead of 0.255 g water. A solvent-insoluble gel was produced in the system.

COMPARATIVE EXAMPLE 2

An experiment was run according to Example 1 with the following two modifications to the first water addition step: the temperature of the reaction system was maintained at 30° C. and the water was added directly without dissolution in THF. This experiment produced a solvent-insoluble gel in the system.

COMPARATIVE EXAMPLE 3

An experiment was run according to Example 1 with the following two modifications to the first water addition step: the temperature of the reaction system was maintained at 30°

C. and the water dissolved in THF was added within 1 second. This experiment produced a solvent-insoluble gel in the system.

COMPARATIVE EXAMPLE 4

An experiment was run according to Example 1 with the following modification: while maintaining the temperature of the reaction system at −78° C., the titanium tetra-n-butoxide, ethyl orthosilicate, and water (0.45 g in 10 mL THF) were mixed all at once. This experiment produced a solvent-insoluble gel in the system.

EXAMPLE 2

To a solution consisting of a mixture of 6.13 g (18.0 mmol) titanium tetra-n-butoxide and 10 mL THF, was added at −78° C. a solution consisting of a mixture of 0.324 g (18 mmol) water and 4 mL THF. The reaction was subsequently allowed to return to room temperature and was stirred for 1 hour. After re-cooling to −78° C., 2.45 g (11.8 mmol) ethyl orthosilicate was added and the reaction was stirred. This was followed by the dropwise addition of 0.324 mg (18 mmol) water in 4 mL THF. The solution temperature was then allowed to return to room temperature and the reaction was stirred for another 30 minutes thereafter. A 50 mL ether solution that contained 70 mmol vinyldimethylsilanol and 50 mmol trimethylsilanol and added and the reaction was stirred for 30 minutes. The reaction was then developed by gradually heating to 120° C. while distilling the solvent. Removal of the solvent and low boilers at 120° C. under reduced pressure ultimately yielded 4.55 g of a transparent, light-yellow solid.

This product was soluble in organic solvents such as THF, toluene, hexane, and carbon tetrachloride. Its molecular weight was 8.40×10$^5$, and its index of refraction at 25° C. was 1.459. The analytic results gave the following compositional formula:

$(TiO_{4/2})_{0.6}(SiO_{4/2})_{0.4}(ViMe_2SiO_{1/2})_{0.56}(Me_3SiO_{1/2})0.44$

EXAMPLE 3

To a solution consisting of a mixture of 5.69 g (20 mmol) titanium tetraisopropoxide and 10 mL THF, was added at −78° C. a solution consisting of a mixture of 0.36 g (20 mmol) water and 6 mL THF. The reaction was subsequently allowed to return to room temperature and was stirred for 1 hour. After re-cooling to −78° C., 1.97 g (12.9 mmol) ethyl orthosilicate was added and the reaction was stirred. This was followed by the dropwise addition of 0.36 g (20 mmol) water in 6 mL THF. The solution temperature was then allowed to return to room temperature and the reaction was stirred for another 30 minutes thereafter. A 70 mL ether solution that contained 40 mmol vinyldimethylsilanol and 60 mmol trimethylsilanol was added and the reaction was stirred for 30 minutes. The reaction was then developed by gradually heating to 100° C. while distilling the solvent. Removal of the solvent and low boilers at 100° C. under reduced pressure ultimately yielded 6.13 g of a transparent, highly viscous yellow liquid.

This product was soluble in organic solvents such as THF, toluene, hexane, and carbon tetrachloride. Its molecular weight was 650, and its index of refraction at 25° C. was 1.490. The analytic results gave the following compositional formula:

$(TiO_{4/2})_{0.41}(SiO_{4/2})_{0.39}(ViMe_2SiO_{1/2})_{0.49}(MeSiO_{1/2})_{0.56}$

EXAMPLE 4

To a solution consisting of a mixture of 6.54 g (19.2 mmol) titanium tetra-n-butoxide and 10 mL THF, was added at −78° C. a solution consisting of a mixture of 0.35 g (19 mmol) water and 6 mL THF. The reaction was subsequently allowed to return to room temperature and was stirred for 1 hour. After re-cooling to −78° C., 2.35 g (ethoxy group=38 mmol, SiO$_2$content=40 weight %) of an already partially hydrolyzed and condensed ethyl orthosilicate was added and the reaction was stirred. This was followed by the dropwise addition of 0.35 g (19 mmol) water in 6 mL THF. The solution temperature was then allowed to return to room temperature and the reaction was stirred for another 30 minutes thereafter. A 50 mL ether solution that contained 60 mmol phenyldimethylsilanol was added and the reaction was stirred for 30 minutes. The reaction was then developed by gradually heating to 120° C. while distilling the solvent. Removal of the solvent and low boilers at 120° C. under reduced pressure ultimately yielded 6.35 g of a transparent, highly viscous yellow liquid.

This product was soluble in organic solvents such as THF, toluene, hexane, and carbon tetrachloride. Its molecular weight was 3.66×10$^5$, and its index of refraction at 25° C. was 1.572. The analytic results gave the following compositional formula:

$(TiO_{4/2})_{0.55}(SiO_{4/2})_{0.45}(PhMe_2SiO_{1/2})_{0.50}$

EXAMPLE 5

To a solution consisting of a mixture of 5.27 g (15.5 mmol) titanium tetra-n-butoxide and 10 mL THF, was added at 5° C. silica gel to which 0.27 g water (15 mmol) had been adsorbed. The reaction was subsequently allowed to return to room temperature and was stirred for 3 hours. Ethyl orthosilicate (3.33 g, 16 mmol) was added and the reaction was stirred. This was followed by the addition of silica gel on which 0.28 g water (16 mmol) had been adsorbed, and stirring for 6 hours at 60° C. The solution temperature was then allowed to return to room temperature. 18 mmol vinyldimehtylacetoxysilane and 35 mmol trimethylacetoxysilane were added and the reaction was stirred for another 30 minutes. The reaction was then developed by gradually heating to 120° C. while distilling the solvent. Removal of the solvent and low boilers at 120° C. under reduced pressure ultimately yielded 3.71 g of a transparent, highly viscous and light-brown liquid.

This product was soluble in organic solvents such as THF, toluene, hexane, and carbon tetrachloride. Its molecular weight was 3.94×10$^4$. The analytic results gave the following compositional formula:

$(TiO_{4/2})_{0.49}(SiO_{4/2})_{0.51}(ViMe_2SiO_{1/2})_{0.16}(Me_3SiO_{1/2})_{0.29}(C_2H_5O_{1/2})_{0.25}(C_4H_9O_{1/2})_{0.06}$

A polytitanosiloxane prepared using the preparative method of the invention does not contain gel, is stable with respect to moisture and heat, and is soluble in organic solvents. These attributes make such polytitanosiloxane extremely useful, for example, as an antireflection coating.

We claim:

1. A method for the preparation of organic solvent-soluble polytitanosiloxanes, the method comprising:

(1) adding water simultaneously or successively to a tetraalkyl titanate or partial hydrolyzate-condensate thereof and a tetraalkyl silicate or partial hydrolyzate-condensate thereof in an amount which is less than 80% of the amount theoretically necessary for the hydrolysis and condensation of all alkoxy groups on the tetraalkyl titanate or partial hydrolyzate-condensate thereof and the tetrallkyl silicate or partial hydrolyzate-condensate thereof, so that a partial cohydrolyzate-cocondensate forms; and (2) reacting the partial cohydrolyzate-cocondensate with at least 1 silane compound with a formula $R^1_a R^2_{(3-a)} SiOR^3$, where $R^1$ is selected from the group consisting of a hydrogen atom and a monovalent organic group, $R^2$ is a monovalent organic group, $R^3$ is selected from the group consisting of a hydrogen atom and an acyl group having no more than 8 carbon atoms, and a is an integer with a value of 0 to 3.

2. The method of claim 1, wherein $R^1$ and $R^2$ are selected from the group consisting of methyl, vinyl and phenyl.

3. The method of claim 1, wherein $R^3$ is selected from the group consisting of the hydrogen atom and an acetyl group.

4. The method of claim 2, wherein $R^3$ is selected from the group consisting of the hydrogen atom and an acetyl group.

5. The method of claim 1, wherein the water addition step is selected from the group consisting of:

(1) adding water at a rate such that no more than 10% of the overall quantity of water to be added is added per minute;

(2) adding water dissolved in at least an equal volume of an organic solvent;

(3) adding water carried on a water-adsorptive solid;

(4) adding water after the tetraalkyl titanate or partial hydrolyzate-condensate thereof and the tetraalkyl silicate or partial hydrolyzate-condensate thereof have been cooled to 20° C. or less; and (5) any combination thereof.

6. The method of claim 2, wherein the water addition step is selected from the group consisting of:

(1) adding water at a rate such that no more than 10% of the overall quantity of water to be added is added per minute;

(2) adding water dissolved in at least an equal volume of an organic solvent;

(3) adding water carried on a water-adsorptive solid;

(4) adding water after the tetraalkyl titanate or partial hydrolyzate-condensate thereof and the tetraalkyl silicate or partial hydrolyzate-condensate thereof have been cooled to 20° C. or less; and (5) any combination thereof.

7. The method of claim 3, wherein the water addition step is selected from the group consisting of:

(1) adding water at a rate such that no more than 10% of the overall quantity of water to be added is added per minute;

(2) adding water dissolved in at least an equal volume of an organic solvent;

(3) adding water carried on a water-adsorptive solid;

(4) adding water after the tetraalkyl titanate or partial hydrolyzate-condensate thereof and the tetraalkyl silicate or partial hydrolyzate-condensate thereof have been cooled to 20° C. or less; and (5) any combination thereof.

8. The method of claim 4, wherein the water addition step is selected from the group consisting of:

(1) adding water at a rate such that no more than 10% of the overall quantity of water to be added is added per minute;

(2) adding water dissolved in at least an equal volume of an organic solvent;

(3) adding water carried on a water-adsorptive solid;

(4) adding water after the tetraalkyl titanate or partial hydrolyzate-condensate thereof and the tetraalkyl silicate or partial hydrolyzate-condensate thereof have been cooled to 20° C. or less; and (5) any combination thereof.

9. A method for the preparation of organic solvent-soluble polytitanosiloxanes, the method comprising:

(1) adding water simultaneously or successively to a tetraalkyl titanate and a tetraalkyl silicate in an amount which is less than 80% of the amount theoretically necessary for the hydrolysis and condensation of all alkoxy groups on the tetraalkyl titanate and the tetraalkyl silicate, so that a partial cohydrolyzate-cocondensate forms; and (2) reacting the partial cohydrolyzate-cocondensate with at least 1 silane compound with a formula $R^1_a R^2_{(3-a)} SiOR^3$, where $R^1$ is selected from the group consisting of a hydrogen atom and a monovalent organic group, $R^2$ is a monovalent organic group, $R^3$ is selected from the group consisting of a hydrogen atom and an acyl group having no more than 8 carbon atoms, and a is an integer with a value of 0 to 3.

* * * * *